No. 689,795. Patented Dec. 24, 1901.
J. S. COPELAND.
BICYCLE DRIVING MECHANISM.
(Application filed Mar. 29, 1899.)
(No Model.)
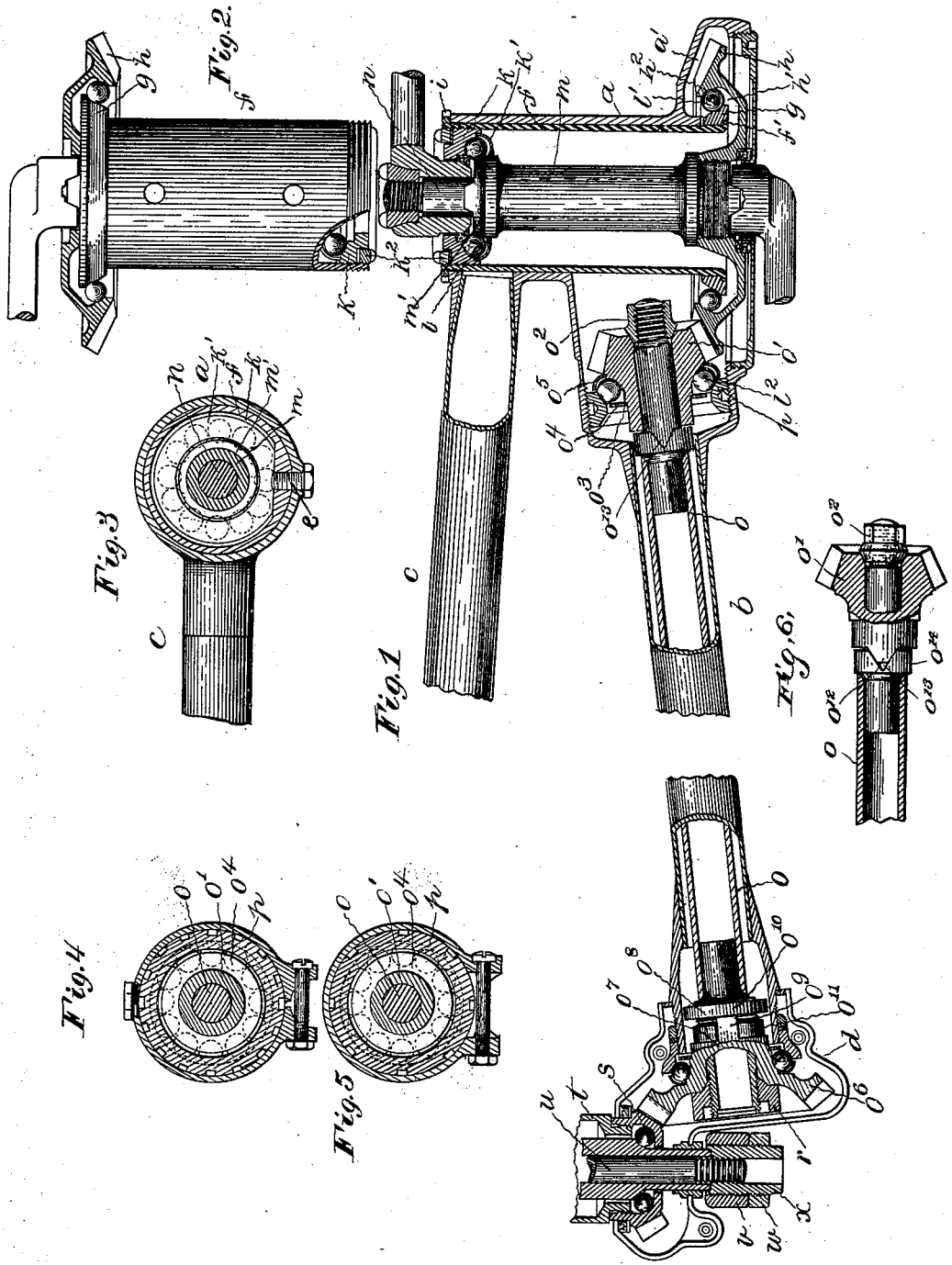
Witnesses:
William H. Barker
Arthur G. Jenkins
Inventor:
James S. Copeland
by Chas. L. Birdseye
Attorney

UNITED STATES PATENT OFFICE.

JAMES S. COPELAND, OF HARTFORD, CONNECTICUT, ASSIGNOR TO AMERICAN BICYCLE COMPANY, OF JERSEY CITY, NEW JERSEY, AND NEW YORK, N. Y., A CORPORATION OF NEW JERSEY.

BICYCLE DRIVING MECHANISM.

SPECIFICATION forming part of Letters Patent No. 689,795, dated December 24, 1901.

Application filed March 29, 1899. Serial No. 710,907. (No model.)

*To all whom it may concern:*

Be it known that I, JAMES S. COPELAND, a citizen of the United States, and a resident of Hartford, in the county of Hartford and State of Connecticut, have invented certain new and useful Improvements in Bicycle Driving Mechanism, of which the following is a full, clear, and exact description, whereby any one skilled in the art can make and use the same.

My invention is shown herein as embodied in a velocipede of the so-called "chainless" form; and it relates to those parts by means of which a more convenient and effective adjustment of the several gears to a true running fit may be effected.

To this end my invention consists in the details of construction of the running-gear of the machine and in the combination of such parts, as hereinafter described, and more particularly pointed out in the claims.

Referring to the drawings, Figure 1 is a plan view of that part of a chainless bicycle showing the lower rear fork and parts more especially appurtenant to the driving mechanism, with parts cut away in section to show construction. Fig. 2 is a detail bottom view of the crank-shaft bushing, showing the main gear-wheel in place and with parts cut away to show construction. Fig. 3 is a detail view, in cross-section, through the crank-shaft bracket on a line passing through one of the openings in the crank-shaft bushing. Fig. 4 is a detail view, in cross-section, through the front end of the right-hand lower rear fork side on a line passing through the recess in the ball-cases. Fig. 5 is a detail view, in cross-section, on the same line, but showing a modified form of construction. Fig. 6 is a detail view of the front end of the connecting-shaft, showing the pinion partly in section.

In the acompanying drawings the letter $a$ denotes the crank-shaft bracket of a bicycle, in which the socket for the crank-shaft and its bearings is formed.

The side members $b\ c$ of the lower rear fork of the frame are secured to the crank-shaft bracket or crank-hanger $a$ in any usual manner and are provided at their opposite ends with suitable means for attachment of the driving-wheel axle, the fork side $b$ having a bracket $d$ at its rear end.

A crank-shaft bushing $f$ fits closely within the socket in the crank-hanger $a$, one end of this bushing having on its outer surface a shoulder $f'$, preferably formed by a flange. The cone $g$, formed of a ring of metal secured to the bushing in any convenient manner, as by driving it on until it rests against the shoulder at the end, has a ball-race which looks toward the enlargement or recess $a'$ in the bracket $a$, in which recess a bevel gear-wheel $h$ is located. The opposite end of the bushing $f$ extends slightly beyond the edge of the wall of the bracket and is threaded to receive a nut $i$, which is screwed upon the bushing and by contact with the outer surface of the bracket, against which it abuts, serves to adjust the bushing and connected parts. A set-screw $e$, Fig. 3, projects through the crank-hanger and into the bushing $f$ and serves to hold the latter securely in position when the proper adjustment between the pinion $o'$ and the gear $h$ has been obtained. A ball-bearing case $k$ is held within the bushing at the end, as by means of screw-threads on the respective parts, and balls $l$ are located between this case $k$ and a cone $m'$, formed on the sleeve $m$, which surrounds the crank-shaft $n$ for a part of its length within the crank-shaft bracket. On the threaded end of the sleeve $m$, opposite this cone $m'$, the bevel-gear $h$ is secured, with its hub held in contact with a shoulder on the sleeve or in any known manner. The bevel-gear $h$ has an annular recess $h'$ in the side toward the bracket $a$, and the end of the bushing $f$ with the cone $g$ is located in this recess, the diameter of which is enough larger than that of the cone to permit the latter to be freely entered in the recess. The side walls of this recess $h'$ in the gear $h$ are undercut, so as to form a case $h^2$, that, with the cone $g$ on the bushing, provides a ball-race in which the balls $l'$ are retained. The teeth of this gear-wheel $h$ face inward, as shown in the drawings, and engage the teeth on a pinion $o'$ on the front end of the connecting-shaft $o$.

In assembling the parts the gear $h$ is secured to the sleeve by any known method. The case $k$, with the balls held by the retainer $k'$, is screwed into the bushing a short distance. The gear $h$ is then placed on its back and the bushing slipped onto the sleeve, the end of the bushing extending into the recess $h'$ in the face of the gear far enough to allow the balls to be dropped in the recess back of the undercut edge of the gear. The case $k$ is then screwed in until the balls $l$ strike the cone $m'$ on the sleeve $m$, and thus lift the bushing until the balls $l'$ are held between the cone $g$ on the bushing and the case $h^2$ in the recess in the gear $h$. When the desired adjustment of these bearing parts has been made, a lock-nut $k^2$ is screwed into the bushing and against a tongued washer that rests against the back of the case $k$ in the usual manner, thus holding the parts firmly in said position of adjustment. The bushing $f$ and the parts connected with it, as above described, are then ready to be located within the socket in the crank-shaft bracket, except that the nut $i$ is not attached in place until after the bushing has been thrust through the socket. The function of this nut $i$ is to move the parts secured to the bushing (including the gear-wheel $h$) in a line transversely of the central plane of the frame or in a line parallel to the axis of the crank-shaft. The connecting-shaft $o$ is arranged and supported on the frame so that the pinion $o'$ on its front end is adapted to mesh with the gear-wheel $h$, secured to the crank-shaft. The pinion $o'$ is held against rotation by projections on the one part having beveled edges taking into corresponding sockets on the opposite part, the pinion being seated in place with this beveled surface in contact with a space between the hub proper of the gear and the shoulder, a nut $o^2$ on the end of the connecting-shaft holding the pinion to its seat. On the back of the pinion $o'$ a cone $o^3$ is formed, provided with retainers $o^4 o^5$, which hold the balls $l^2$ in place.

In Fig. 1 the tubular part of the connecting-shaft $o$ is shown in section, and the solid end, which supports the pinion, is shown in full outline and shaded. The socket $o^{13}$ is shown in the face of the shoulder, the projection $o^{12}$ on the end of the hub of the pinion $o'$, which fits said socket, being shown in Fig. 6. As this end of the shaft $o$ has a shoulder against which the end of the hub of the pinion $o'$ rests and the adjacent surfaces have interengaging projections $o^{12}$ and sockets $o^{13}$, the nut $o^2$, screwed upon the threaded end of the shaft $o$, holds the pinion in place on the shaft and against rotation on it. When the pinion $o'$ turns, the shaft $o$ turns with it.

Back of the pinion $o'$ and in a recess in the bracket or frame having a threaded wall a ball-case $p$, with peripheral thread, is located. This ball-case is adjustable lengthwise of the shaft and is rotated by means of a pin inserted through a hole in the wall of the bracket or frame member, so as to form the proper support for the balls $l^2$, located between this case and the cone on the pinion $o'$.

On the rear end of the connecting-shaft $o$ a pinion $o^6$ is secured by means which permit of its lengthwise adjustment upon the shaft, but which prevent rotation except with the shaft. In this form of connecting means the pinion $o^6$ has a hub $o^7$, somewhat elongated and extending within a recess in the rear bracket or an enlargement on this end of the fork side of the frame. Projections $o^9$ on the end of the hub rest against a nut $o^{10}$, which fits a threaded portion on the connecting-shaft $o$ and is adjustable along the shaft, an enlargement $o^{11}$ on the shaft having (preferably upon opposite sides) lengthwise open slots $o^8$, into which the projections $o^9$ extend and fit closely. A nut $r$, screwed upon the end of the shaft and against the recessed face of the pinion $o^6$, holds the latter firmly against the nut $o^{10}$. This pinion $o^6$ is made adjustable in order that the required running fit between the pinions $o^6$ and $s$ may be secured.

The several parts of the running-gear are connected and adjusted as follows: The connecting-shaft $o$, with the pinion $o^6$ secured to the rear end, is inserted in the tubular member of the frame, (when such form of support is used,) and the pinion $o'$ is then secured to the front end of the shaft, the ball-case $p$ having been first brought into place in its socket. The bushing, with the sleeve and the main gear-wheel and their bearings attached, is inserted in the socket in the crank-shaft bracket and the nut $i$ screwed upon the end of the bushing, the teeth of the main gear-wheel $h$ meshing with the teeth of the pinion $o'$. The bushing is moved in a direction lengthwise of the crank-shaft, and as nearly as possible at the same time the connecting-shaft $o$ is moved in or out, as the case may be, until the proper degree of adjustment of the teeth on the gears has been secured. When the proper position of the connecting-shaft lengthwise has been reached, it is held in that position by adjusting the ball-case $p$ in proper running fit with the balls located between it and the cone formed on the back of the pinion $o'$ and clamping it in this position by any known means—as, for instance, by bolts, as shown in Figs. 4 and 5. The manner of securing the main gear and sleeve to the adjustable bushing, which is close-fitting and adjustable within the socket in the crank-bracket, is provided for the purpose of securing the proper engagement and fit between the teeth on the main gear and on the pinion on the connecting-shaft and is of great advantage, not only as a mechanical device, but also owing to the saving made in time taken to properly assemble and adjust the running part of the geared mechanism and also in that the adjustment of the bushing of the main gear with the pinion does not affect the main gear or crank-shaft bearings.

The assembling and adjustment of the rear hub-gear with its mate is effected as follows: The rear wheel is inserted in the frame and supported on the axle $u$. The adjusting-sleeve $x$ is screwed into the latch $v$, adapted to be rigidly secured to the frame, and clamped in position by the nut $w$. The axle $u$ is then screwed into the sleeve $x$. The adjustment of the gears is then effected by the lengthwise movement of the gear $o^6$ on the connecting-shaft $o$ by means of the nuts $r$ and $o^{10}$ and the lengthwise movement of the hub $t$ on its axle $u$ by means of the adjusting-sleeve $x$, after which the adjusting-sleeve $x$ is locked in position by the nut $w$. It is evident that this feature of the invention is applicable to any form of wheels driven the one by the other by means of interengaging parts and is not limited to any special form of gear—as, for instance, the bevel-gear in connection with which it has been described in the within specification.

I claim as my invention—

1. In a vehicle driving mechanism, in combination, a driving-shaft bracket, a cylindrical bushing adjustably mounted within said bracket and extending beyond its socket at both ends, a lock-nut screwed onto one end of the bushing, a ball-supporting case secured to the other end of the bushing, a driving-shaft located within the bushing, ball-bearings between the shaft and the inner surface of the bushing, a bevel gear-wheel secured to the shaft and having an undercut edge forming a cone, and ball-bearings located between said undercut cone and the case on the outside of the bushing.

2. In a driving mechanism, a connecting-shaft with means for rotating it, a pinion having free lengthwise movement on the shaft and lugs projecting therefrom, a nut adjustably secured to the shaft and forming a seat for said pinion, a collar having recesses for the reception of the lugs on the pinion, and means for holding the pinion against its seat.

3. In a vehicle driving mechanism, in combination, a crank-shaft bracket, a tubular bushing adjustably mounted in said bracket and projecting at both ends beyond it, means for adjusting said bushing lengthwise within said bracket, the driving-shaft located within and borne by ball-bearings on said bushing, a main gear-wheel fast to said shaft, and means projecting transversely through the bracket and into the bushing and preventing movement of the latter.

JAMES S. COPELAND.

Witnesses:
BRAYTON S. LEWIS,
H. E. HART.